United States Patent [19]
Avidan et al.

[11] Patent Number: 5,268,089
[45] Date of Patent: Dec. 7, 1993

[54] FCC OF NITROGEN CONTAINING HYDROCARBONS AND CATALYST REGENERATION

[75] Inventors: Amos A. Avidan, Yardley, Pa.; Mark F. Mathias, Turnersville, N.J.; Raghu K. Menon, Medford, N.J.; Joseph F. Sodomin, III, Centerville, Va.; Scott A. Stevenson, Newton, Pa.; Gerald J. Teitman, Vienna, Va.

[73] Assignee: Mobil Oil Corporation, Fairfax, Va.

[21] Appl. No.: 903,406

[22] Filed: Jun. 24, 1992

[51] Int. Cl.$^5$ .................. C10G 11/18; C10G 11/05; B01J 38/36; B01J 29/38
[52] U.S. Cl. .................. 208/113; 208/120; 208/164; 502/41; 502/42; 502/43
[58] Field of Search .................. 502/41, 42, 43; 208/113, 164, 120

[56] References Cited
U.S. PATENT DOCUMENTS

| | | | |
|---|---|---|---|
| 4,180,454 | 12/1979 | Luckenbach | 502/42 |
| 4,198,287 | 4/1980 | Hemler, Jr. et al. | 502/42 |
| 4,812,430 | 3/1989 | Child | 502/41 |
| 5,002,654 | 3/1991 | Chin | 208/113 |
| 5,077,251 | 12/1991 | Owen et al. | 502/43 |
| 5,077,252 | 12/1991 | Owen et al. | 502/43 |

Primary Examiner—Paul E. Konopka
Attorney, Agent, or Firm—Alexander J. McKillop; Malcolm D. Keen; Richard D. Stone

[57] ABSTRACT

Oxides of nitrogen ($NO_x$) emissions from an FCC regenerator are reduced by forcing the regenerator to operate between full and partial CO burn mode. Operating with less than 1 mole % O2 and up to 1 or 2% CO in the flue gas creates conditions which oxidize nitrogen compounds in coke on spent catalyst to NOx, and simultaneously convert NOx in the regenerator to nitrogen. A downstream CO boiler can burn this low CO flue gas without producing large amounts of NOx. Most NOx emissions can be eliminated. An apparatus, with the regenerator air:coke ratio controlled by both CO and O2 analyzers monitoring regenerator flue gas, is also disclosed.

14 Claims, 2 Drawing Sheets

FCC OF NITROGEN CONTAINING HYDROCARBONS AND CATALYST REGENERATION

BACKGROUND OF THE INVENTION

1. FIELD OF THE INVENTION

The invention relates to regeneration of spent catalyst from an FCC unit in a way which reduces NOx emissions.

2. DESCRIPTION OF RELATED ART $NO_x$ or oxides of nitrogen in flue gas streams from FCC regenerators is a pervasive problem. FCC units process heavy feeds containing nitrogen compounds and much of this material is eventually converted into NOx emissions, either in the FCC regenerator (if operated in full CO burn mode) or in a downstream CO boiler (if operated in partial CO burn mode). Thus, all FCC processing nitrogen containing feeds can have a NOx emissions problem due to catalyst regeneration, but the type of regeneration employed (full or partial CO burn mode) will determine whether NOx emissions appear sooner (regenerator flue gas) or later (CO boiler).

Although there may be some nitrogen fixation or conversion of nitrogen in regenerator air to NOx most of the NOx emissions are believed to come from oxidation of nitrogen compounds in the feed.

Several powerful ways have been developed to deal with the problem. The approaches fall into roughly five categories:

1. Feed hydrotreating to keep NOx precursors from the FCC unit.
2. Segregated cracking of fresh feed.
3. Process approaches which reduce the $NO_x$ formation in a regenerator in complete CO burn mode via regenerator modifications.
4. Catalytic approaches, using a catalyst or additive which is compatible with the FCC reactor, which suppress NOx formation or catalyze its reduction in a regenerator in complete CO burn mode or reduction of $NO_x$ precursors (e.g. NH3) to the CO boilers in partial CO burn mode.
5. Stack gas cleanup methods which are isolated from the FCC process.

The FCC process will be briefly reviewed, followed by a review of the state of the art in reducing $NO_x$ emissions.

FCC PROCESS

Catalytic cracking of hydrocarbons is carried out in the absence of externally supplied H2, in contrast to hydrocracking, in which H2 is added during the cracking step. An inventory of particulate catalyst is continuously cycled between a cracking reactor and a catalyst regenerator. In the fluidized catalytic cracking (FCC) process, hydrocarbon feed contacts catalyst in a reactor at 425C.-600 C., usually 460 C.-560 C. The hydrocarbons crack and deposit carbonaceous hydrocarbons or coke on the catalyst. The cracked products are separated from the coked catalyst. The coked catalyst is stripped of volatiles, usually with steam and is then regenerated. In the catalyst regenerator, the coke is burned from the catalyst with oxygen-containing gas, usually air. Coke burns off, restoring catalyst activity and simultaneously heating the catalyst to, e.g., 500 C.-900 C., usually 600 C.-750 C. Flue gas, formed by burning coke in the regenerator, may be treated for removal of particulates and for conversion of carbon monoxide after which the flue gas is normally discharged into the atmosphere.

Most FCC units now use zeolite-containing catalyst having high activity and selectivity. These catalysts are generally believed to work best when the amount of coke on the catalyst after regeneration is relatively low.

Two types of FCC regenerators are now commonly used: the high efficiency regenerator and the bubbling bed type.

The high efficiency regenerator mixes recycled regenerated catalyst with spent catalyst burns much of the coke from spent catalyst in a fast fluidized bed coke combustor, then discharges catalyst and flue gas up a dilute phase transport riser where some additional coke combustion occurs, and where most of the CO is after-burned to CO2. These regenerators are designed for complete CO combustion and usually produce clean burned catalyst and flue gas with very little CO and modest amounts of NOx.

The bubbling bed regenerator maintains the catalyst as a bubbling fluidized bed, to which spent catalyst is added and from which regenerated catalyst is removed. These regenerators usually require more catalyst inventory in the regenerator because gas/catalyst contacting is not as efficient in a bubbling fluidized bed as in a fast fluidized bed.

Many bubbling bed regenerators operate in complete CO combustion mode, i.e., the mole ratio of CO2/CO is at least 50. Refiners try to burn CO completely within the catalyst regenerator to conserve heat and to minimize air pollution. Among the ways suggested to decrease the amount of carbon on regenerated catalyst and to burn CO in the regenerator is to add a CO combustion promoter metal to the catalyst or to the regenerator.

Metals have been added as an integral component of the cracking catalyst and as a component of a discrete particulate additive in which the active metal is associated with a support other than the catalyst. U.S. Pat. No. 2,647,860 proposed adding 0.1 to 1 weight percent chromic oxide to a cracking catalyst to promote combustion of CO. U.S. Pat. No. 3,808,121 taught using relatively large-sized particles containing CO combustion-promoting metal into a cracking catalyst regenerator. The circulating particulate solids inventory of small-sized catalyst particles, cycled between the cracking reactor and the catalyst regenerator while the combustion-promoting particles remain in the regenerator.

U.S. Pat. Nos. 4,072,600 and 4,093,535 teach use of combustion-promoting metals such as Pt, Pd, Ir, Rh, Os, Ru and Re in cracking catalysts in concentrations of 0.01 to 50 ppm based on total catalyst inventory. This approach is so successful that most FCC units operating in full CO combustion mode use Pt CO combustion promoter. This reduces CO emissions but usually increases nitrogen oxides ($NO_x$) in the regenerator flue gas.

It is difficult in a catalyst regenerator to burn completely coke and CO in the regenerator without increasing the $NO_x$ content of the regenerator flue gas. Many jurisdictions have passed legislation restricting the amount of NOx that can be in a flue gas stream discharged to the atmosphere. In response to environmental concerns, much effort has been spent on finding ways to reduce NOx emissions.

The NOx problem is most acute in bubbling dense bed regenerators, perhaps due to localized high oxygen concentrations in the large bubbles of regeneration air. Even the high efficiency regenerators, with better catalyst/gas contacting, produce significant amounts of NOx though usually only about 20-75 % of the NOx which would be produced in a bubbling dense bed regenerator cracking a similar feed.

Much of the discussion that follows is generic to any type of regenerator (usually feed preparation, catalyst additives), while much is specific to bubbling dense bed regenerators.

FEED HYDROTREATING

Some refiners now go to the expense of hydrotreating feed. This is usually done more to meet sulfur specifications in various cracked products or a SOx limitation in regenerator flue gas rather than a NOx limitation. Hydrotreating will reduce to some extent the nitrogen compounds in FCC feed, and this will help reduce the NOx emissions from the regenerator.

SEGREGATED FEED CRACKING

U.S. Pat. No. 4,985,133, Sapre et al, incorporated by reference taught that refiners processing multiple feeds could reduce NOx emissions and improve performance in the cracking reactor by keeping high and low nitrogen feeds segregated and adding them to different elevations in the FCC riser.

PROCESS APPROACHES TO $NO_x$ CONTROL

Process modifications are suggested in U.S. Pat. No. 4,413,573 and U.S. Pat. No. 4,325,833, both directed to two- and three-stage FCC regenerators which reduce $NO_x$ emissions.

U.S. Pat. No. 4,313,848 teaches countercurrent regeneration of spent FCC catalyst, without backmixing, to minimize $NO_x$ emissions.

U.S. Pat. No. 4,309,309 teaches the addition of a vaporizable fuel to the upper portion of a FCC regenerator to minimize $NO_x$ emissions. Oxides of nitrogen, formed in the lower portion of the regenerator, are reduced in the reducing atmosphere generated by burning fuel in the upper portion of the regenerator.

U.S. Pat. No. 4,542,114 taught minimizing the volume of flue gas by using oxygen rather than air in the FCC regenerator with consequent reduction in the amount of flue gas produced.

In Green et al, U.S. Pat. No. 4,828,680, incorporated by reference, $NO_x$ emissions from an FCC unit were reduced by adding carbonaceous particles such as sponge coke or coal into the circulating inventory of cracking catalyst. The carbonaceous particles performed selectively absorbtion of metal contaminants in the feed and also reduced $NO_x$ emissions. Many refiners are reluctant to add coal or coke to their FCC units, and such materials also burn and increase the heat release in the regenerator. Most refiners would prefer to reduce rather than increase heat release in their regenerators.

DENOX WITH COKE

U.S. Pat. No. 4,991,521, Green and Yan, showed that a regenerator could be designed so coke on spent FCC catalyst could be used to reduce NOx emissions from an FCC regenerator. The patent disclosed a two-stage FCC regenerator wherein flue gas from a second stage of regeneration contacted coked catalyst. Although effective at reducing NOx emissions, this approach is not readily adaptable to existing units.

DENOX WITH REDUCING ATMOSPHERES

Another process approach to reducing NOx emissions from FCC regenerators is to create a relatively reducing atmosphere in some portion of the regenerator by segregating the CO combustion promoter. Reduction of $NO_x$ emissions in FCC regenerators was achieved in U.S. Pat. Nos. 4,812,430 and 4,812,431 by using a conventional CO combustion promoter (Pt) on an unconventional support which permitted the support to segregate in the regenerator. Use of large, hollow, floating spheres gave a sharp segregation of CO combustion promoter in the regenerator. Disposing the CO combustion promoter on fines and allowing these fines to segregate near the top of a dense bed, or to be selectively recycled into the dilute phase above a dense bed, was another way to segregate the CO combustion promoter.

CATALYTIC APPROACHES TO $NO_x$ CONTROL

The work that follows is generally directed at special catalysts which promote CO combustion but do not promote formation of much NOx.

U.S. Pat. No. 4,300,997 and U.S. Pat. No. 4,350,615 are both directed to use of Pd-Ru CO-combustion promoter. The bi-metallic CO combustion promoter is reported to do an adequate job of converting CO to CO2 while minimizing the formation of $NO_x$.

U.S. Pat. No. 4,199,435 suggests steam treating conventional metallic CO combustion promoter to decrease $NO_x$ formation without impairing too much the CO combustion activity of the promoter.

U.S. Pat. No. 4,235,704 suggests too much CO combustion promoter causes $NO_x$ formation and calls for monitoring the $NO_x$ content of the flue gases and adjusting the concentration of CO combustion promoter in the regenerator based on the amount of $NO_x$ in the flue gas. As an alternative to adding less CO combustion promoter, the patentee suggests deactivating it in place by adding something to deactivate the Pt, such as lead, antimony, arsenic, tin or bismuth.

U.S. Pat. No. 5,002,654, Chin, incorporated by reference, taught the effectiveness of a zinc based additive in reducing NOx. Relatively small amounts of zinc oxides, impregnated on a separate support having little or no cracking activity, produced an additive which could circulate with the FCC equilibrium catalyst and reduce NOx emissions from FCC regenerators.

U.S. Pat. No. 4,988,432, Chin, incorporated by reference, taught the effectiveness of an antimony based additive at reducing NOx.

Many refiners are reluctant to add more metals to their FCC catalyst out of environmental concerns. Some additives, such as zinc, may vaporize under conditions experienced in some FCC units. Adding antimony to FCC catalyst may make disposal of spent catalyst more difficult.

Such additives also add to the cost of the FCC process, may dilute the FCC equilibrium catalyst, and may not be as effective as desired.

In U.S. Pat. No. 5,021,144, Altrichter, taught minimizing CO emissions downstream of a CO boiler by operating an FCC regenerator in partial CO burn mode with at least three times the amount of Pt needed to prevent afterburning. In the region studied, with CO boiler stack oxygen contents ranging from about 1.6 to more than 4 % O2 (low promoter addition) to 1.2 to 3.4 mole % (high promoter addition), adding Pt to the FCC regenerator reduced NOx in the CO boiler stack gas.

Considerable effort has also been spent on downstream treatment of FCC flue gas. This area will be briefly reviewed.

STACK GAS TREATMENT

It is known to react $NO_x$ in flue gas with NH3. NH3 is a selective reducing agent which does not react rapidly with the excess oxygen which may be present in the flue gas. Two types of NH3 process have evolved: thermal and catalytic.

Thermal processes, such as the Exxon Thermal $DeNO_x$ process, operate as homogeneous gas-phase processes at around 1550°–1900° F. More details of such a process are disclosed by Lyon, R. K., Int. J. Chem. Kinet., 3, 315, 1976, incorporated by reference.

Catalytic systems have been developed which operate at lower temperatures, typically at 300°–850° F. These temperatures are typical of flue gas streams. Unfortunately, the catalysts used in these processes are readily fouled, or the process lines plugged, by catalyst fines which are an integral part of FCC regenerator flue gas.

U.S. Pat. Nos. 4,521,389 and 4,434,147 disclose adding NH3 to $NO_x$-containing flue gas to reduce catalytically the $NO_x$ to nitrogen.

U.S. Pat. No. 5,015,362, Chin, incorporated by reference, taught contacting flue gas with sponge coke or coal and a catalyst promoting reduction of NOx in the presence of such carbonaceous substances.

None of the approaches described is the perfect solution.

Feed pretreatment is expensive and can usually only be justified for sulfur removal. Segregated feed cracking helps significantly but requires segregated high and low nitrogen feeds.

Process approaches, such as multi-stage or counter-current regenerators, reduce $NO_x$ emissions but require extensive rebuilding of the FCC regenerator.

Various catalytic approaches, e.g., adding lead or antimony to degrade the efficiency of the Pt function, may help some but fail to meet the ever more stringent $NO_x$ emissions limits set by local governing bodies.

Stack gas cleanup methods are powerful, but the capital and operating costs are high.

We wondered if there was a way to take existing FCC regenerators and convert most of the coke nitrogen to $N_2$ in the regenerator. The problem was most serious in bubbling bed regenerators, but even high efficiency regenerators caused something of a NOx problem.

We knew partial CO combustion was not the answer: little NOx was made in the regenerator, but prodigious amounts of NOx precursors formed to shift the NOx problem to the CO boiler.

We knew complete CO combustion was of limited use. Coke nitrogen is readily converted to NOx in the oxidizing atmosphere of the regenerator, creating an immediate NOx problem rather than deferring it to a CO boiler.

We discovered a new way of operating the FCC regenerator, between partial and complete CO combustion. A regenerator, running with almost no excess air and enough CO so that the flue gas cannot be discharged to the atmosphere but unusually low amounts of CO creates ideal conditions for eliminating most NOx emissions.

By operating with incipient oxygen breakthrough and a limited amount of CO, typically up to about 2 or 2.5 mole % CO, and preferably around 500 to 10,000 ppm CO, we were also "on the brink" of disaster, as slight changes in air rate could cause afterburning with damaging temperature excursions. In fact, extensive amounts of afterburning occurred when CO emissions were low and when NOx emissions were low.

"On the brink" can also be an unsuitable region for CO boiler operation. The flue gas from the FCC regenerator may contain too much CO to be discharged to the atmosphere but not enough CO to permit sustained operation of some CO boilers.

Control of the regenerator, using conventional control methods, becomes difficult. The regenerator is neither firmly in reducing nor oxidizing mode. The bed temperature response to changes in air rate is almost flat. Afterburning can increase or decrease in response to minor changes in air rate, but it is difficult to predict how the unit will respond.

This difficult and uncomfortable regenerator operation provided a way to eliminate most of the NOx emissions traceable to the nitrogenous coke burned in the regenerator. We believed it forced both NOx formation and reduction to occur primarily in the FCC regenerator.

Candor compels mention of the fact that we are not the first to operate in this region. Although this region is an uncomfortable one, probably every FCC unit with a CO boiler passes through it briefly on numerous occasions. FCC regenerators with CO boilers may shift frequently from complete CO combustion in the regenerator (when cracking a distilled feed) to partial CO combustion (when cracking a resid feed) or the reverse. Whenever ar FCC regenerator changes from full to partial CO burn mode, it must pass through this uncomfortable, somewhat unstable region. Although many have passed through this region, we are believed to be the first to stay there, and the first to use it as ar effective way to both create and destroy NOx in the regenerator.

As applied to high efficiency regenerators, there have always been NOx emissions but almost always from the regenerator rather than from a CO boiler, because these regenerators are designed to run in full CO burn mode. We could significantly reduce the already favorable NOx emissions characteristics of these regenerators by operating them in this unstable region.

BRIEF SUMMARY OF THE INVENTION

Accordingly, the present invention provides a process for producing a flue gas containing less than 100 ppm, volume, NOx by burning coke and nitrogen compounds from a spent fluidized catalytic cracking (FCC) catalyst to regenerate said catalyst, wherein said nitrogen compounds are present in an amount sufficient to produce a stack gas NOx content discharged to the atmosphere of at least 100 ppm if said regenerator were operated in complete CO combustion mode or in partial CO combustion mode with a downstream CO boiler, comprising: regenerating a spent FCC catalyst deactivated with coke and nitrogen compounds in a regenerator vessel containing one bubbling fluidized bed of catalyst by adding oxygen or an oxygen-containing regeneration gas to a lower portion of said bubbling bed and operating said regenerator at regeneration conditions, including a dense bed temperature of 1100 to 1400 F. and sufficient to regenerate said spent catalyst and: oxidize at least a portion of the coke and nitrogen compounds on catalyst within said regenerator to NOx, CO and volatilized NOx precursors; cause from 25 to 250 F. of afterburning intermediate said dense bed and a dilute phase region above said dense bed as in claim 1; and produce a regenerator flue gas containing, on a volume %, dry basis: from 0.00 to 1.0 mole % oxygen from 0.05 to 2.0 mole % CO , less than 50 ppm NOx; and volatilized NOx precursors; burning said regenerator flue gas in a CO burning means remote from and downstream of said regenerator by contact with additional oxygen containing gas at CO burning conditions sufficient to oxidize at least 50 % of the CO content of the regenerator flue gas, and produce a CO burner means flue gas containing 0.5 to 6 mole % oxygen, less than 2000 ppm CO and less than 100 ppm NOx.

In another embodiment the present invention provides a process for reducing NOx emissions from a high efficiency regenerator for the regeneration of spent FCC catalyst containing coke and nitrogen compounds comprising operating said regenerator at catalyst regeneration conditions, including a flue gas oxygen content of less than 0.3 mole % oxygen and from 100 to 10,000 ppmv CO.

In an apparatus embodiment, the present invention provides an apparatus for the fluidized catalytic cracking of a heavy, nitrogen containing feed to lighter products and for the combustion of nitrogen containing coke on spent FCC catalyst comprising: a riser reactor cracking means having a base portion connective with a source of nitrogen containing feed and a source of regenerated cracking catalyst; a riser outlet at the top of the riser reactor connective with a catalyst disengaging means for separating a cracked product vapor stream from a spent catalyst stream, and discharging spent catalyst into a catalyst stripper means; a catalyst stripping means receiving spent catalyst from said disengaging means, having a stripping gas inlet and producing a stripper effluent vapor stream and a stripped catalyst stream; a catalyst regenerator vessel for receiving stripped catalyst discharged from said stripping means and maintaining catalyst as a bubbling dense phase fluidized bed of catalyst, said vessel having a regeneration gas flow control means operatively associated with a regeneration gas inlet in a lower portion of said vessel, an outlet for regenerated catalyst in a lower portion of said vessel for recycle of regenerated catalyst to said base of said riser reactor, and an outlet for flue gas in an upper portion of said vessel for discharge of regenerator flue gas; a flue gas transfer line having an inlet connected to said regenerator vessel and an outlet; a CO analyzer controller operatively associated with at least one of said upper portion of said regenerator vessel and said flue gas transfer line from said regenerator vessel; an O2 analyzer controller operatively associated with at least one of said upper portion of said regenerator vessel and said flue gas transfer line from said regenerator vessel; and wherein both said CO and said O2 analyzer controllers control flow of regeneration gas to the said regenerator vessel; a CO combustion means having an inlet for regenerator flue gas connected to said transfer line outlet, an inlet for combustion air, and an outlet for flue gas from said CO combustion means; a CO combustion means transfer line connective with a flue gas discharge stack a NOx analyzer controller operatively associated with said CO combustion means transfer line for analyzing a NOx concentration therein for control of regeneration air flow to said regenerator vessel.

DETAILED DESCRIPTION

Figure 1:
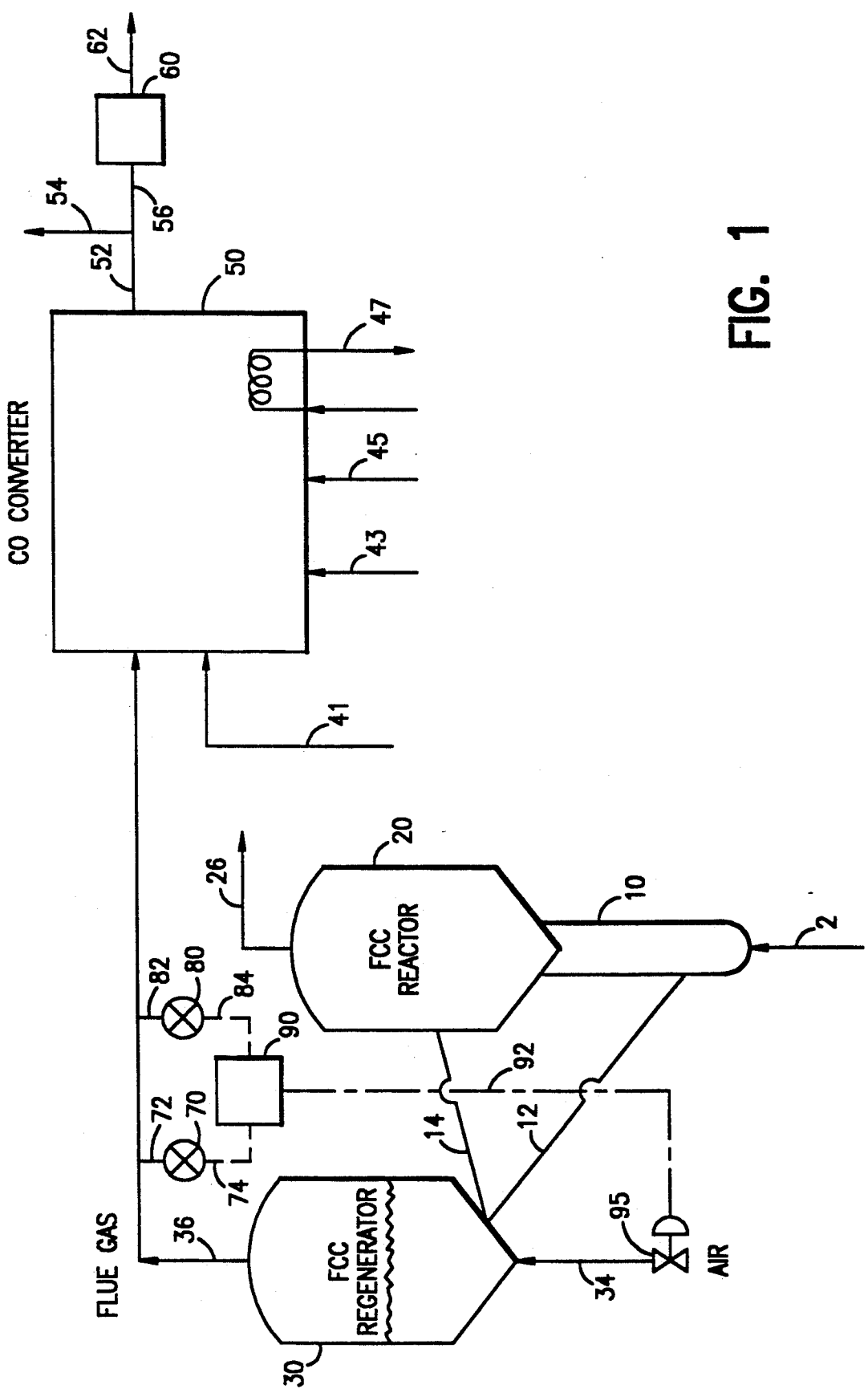
FIG. 1 is a simplified process flow diagram of a preferred configuration, an FCC unit with flue gas analyzer controllers, and a CO boiler.

The process of the present invention is an integral part of the catalytic cracking process. The essential elements of this process will be briefly reviewed in conjunction with a review of FIG. 1.

A heavy, nitrogen containing feed is charged via line 2 to riser reactor 10. Hot regenerated catalyst, removed from the regenerator via line 12, vaporizes fresh feed in the base of the riser reactor and cracks the feed. Cracked products and spent catalyst are discharged into vessel 20 and separated. Spent catalyst is stripped in a stripping means not shown in the base of vessel 20, then stripped catalyst is charged via line 14 to regenerator 30. Cracked products are removed from vessel 20 via line 26 and charged to an FCC main column, not shown.

Spent catalyst is maintained as a bubbling, dense phase fluidized bed in vessel 30. Regeneration gas, almost always air, sometimes supplemented with oxygen, is added via line 34 to the base of the regenerator. Air flow is controlled by flow control valve 95. Regenerated catalyst is removed via line 12 and recycled to the base of the riser reactor. Flue gas is removed via line 36 and charged to preferred, but optional, CO converter 50. In almost all modern refiners, the CO converter will be a CO boiler, or CO combustion means 50, usually equipped with one or more heat recovery means 47, and/or a power recovery turbine 60.

Flue gas from the FCC regenerator is charged via line 36 to the CO converter. Additional combustion air is added via line 41 to ensure there is sufficient air or oxygen present to burn enough CO to meet CO emissions standards. Where desired ammonia, or an ammonia precursor such as urea, may be added via line 43 to react with any NOx formed during CO combustion in the CO converter or CO boiler 50. Additional combustion air is frequently added via line 45 to promote removal of additional amounts of CO. Flue gas is discharged via line 52 to a stack via line 54, or via line 56 to a conventional power recover turbine 60, and from there via line 62 to a stack, not shown.

The process and equipment recited above are those used in conventional FCC regenerators. Many FCC regenerators exist with bubbling bed regenerators and CO boilers.

Unique to the apparatus of the claimed invention is flue gas CO analyzer controller 70 and oxygen analyzer controller 80. This sample, via sample lines 72 and 82, respectively, the flue gas, with results sent via signal transmission, means 74 and 84 to controller means 90. A regeneration air control signal is sent via line 92 to regeneration air control valve 95 to control regeneration air flow. The controller means, which can be a digital or analog computer, can determine if near stoichiometric air is being provided to the regenerator, and make appropriate adjustments.

An alternative, but simple and reasonably effective control scheme, would use both flue gas analyzer controllers to drive control valve 95. A drop in free oxygen content would increase air, while a rise in CO content above, e.g., 1,000 ppm would also increase air. More air is added until a predetermined amount of free oxygen is in the flue gas in line 36, e.g., 0.3 mole %. More air is added, if the CO content of the flue gas becomes excessive, e.g , a CO content above 1:1 or 1 mole %. If the regenerator shifts into something approaching a complete CO burn mode, i.e., the CO content drops below 500 ppm, the regenerator air rate will be reduced. The regenerator may have to be fairly hot, and/or a significant amount of dilute phase afterburning tolerated, in some regenerators for this control method to work. This is because in some regenerators, with poor air distribution or poor catalyst circulation, one side of the regenerator may be just in partial CO burn, while the other side is operating just within complete CO burn mode so that dilute phase afterburning results. In such units, more CO and more O2 must usually be tolerated in the flue gas from the regenerator.

Although the present invention is ideal for use in any catalytic cracking unit with a bubbling bed catalyst regenerator with a CO boiler, as shown in FIG. 1, there are other ways to implement the invention.

A catalytic CO converter may be preferred for new units, so that little CO is present in our process so that for the first time catalytic converters, to remove CO from FCC flue gas, are a viable option. In this way the fuel costs needed to drive the CO boiler in this uncomfortable mode of operation of the FCC regenerator can be eliminated or greatly reduced.

Although the present invention is useful for both moving bed and fluidized bed catalytic cracking units, the discussion that follows is directed to FCC units which are the state of the art.

FCC FEED

Any conventional FCC feed can be used. The process of the present invention is useful for processing nitrogenous charge stocks, those containing more than 500 ppm total nitrogen compounds and especially useful in processing stocks containing very high levels of nitrogen compounds, such as those with more than 1000 wt ppm total nitrogen compounds.

The feeds may range from the typical, such as petroleum distillates or residual stocks, either virgin or partially refined, to the atypical, such as coal oils and shale oils. The feed frequently will contain recycled hydrocarbons, such as light and heavy cycle oils which have already been subjected to cracking.

Preferred feeds are gas oils, vacuum gas oils, atmospheric resids, and vacuum resids. The present invention is most useful with feeds having an initial boiling point above about 650 F.

FCC CATALYST

Commercially available FCC catalysts may be used. The catalyst preferably contains relatively large amounts of large pore zeolite for maximum effectiveness, but such catalysts are readily available. The process will work with amorphous catalyst, but few modern FCC units use amorphous catalyst.

Preferred catalysts for use herein will usually contain at least 10 wt % large pore zeolite in a porous refractory matrix such as silica-alumina, clay, or the like. The zeolite content is preferably much higher than this and should usually be at least 20 wt % large pore zeolite with optimum results achieved when unusually large amounts of large pore zeolite, in excess of 30 wt %, are present in the catalyst. For optimum results, the catalyst should contain from 30 to 60 wt % large pore zeolite.

All zeolite contents discussed herein refer to the zeolite content of the makeup catalyst, rather than the zeolite content of the equilibrium catalyst or E-Cat. Much crystallinity is lost in the weeks and months that the catalyst spends in the harsh, steam filled environment of modern FCC regenerators so the equilibrium catalyst will contain a much lower zeolite content by classical analytic methods. Most refiners usually refer to the zeolite content of their makeup catalyst, and the MAT (Modified Activity Test) or FAI (Fluidized Activity Index) of their equilibrium catalyst, and this specification follows this naming convention.

Conventional zeolites such as X and Y zeolites, or aluminum deficient forms of these zeolites, such as dealuminized Y (DEAL Y), ultrastable Y (USY) and ultrahydrophobic Y (UHP Y), may be used as the large pore cracking catalyst. The zeolites may be stabilized with Rare Earths, e.g., 0.1 to 10 wt % RE.

Relatively high silica zeolite containing catalysts are preferred. Catalysts containing 20-60% USY, or rare earth USY (REUSY), are especially preferred.

The catalyst inventory may also contain one or more additives, either present as separate additive particles or mixed in with each particle of the cracking catalyst. Additives can be added to enhance octane (medium pore size zeolites, sometimes referred to as shape selective zeolites, i.e., those having a Constraint Index of 1-12, and typified by ZSM-5, and other materials having a similar crystal structure).

The FCC catalyst composition, per se. forms no part of the present invention.

CO COMBUSTION PROMOTER

Use of a CO combustion promoter in the regenerator or combustion zone is not essential for the practice of the present invention, however, some may be present. These materials are well-known.

U.S. Pat. Nos. 4,072,600 and 4,235,754, incorporated by reference, disclose operation of an FCC regenerator with minute quantities of a CO combustion promoter. From 0.01 to 100 ppm Pt, or enough other metal to give the same CO oxidation, may be used with good results. Very good results are obtained with as little as 0.1 to 10 wt. ppm platinum present on the catalyst in the unit.

We will usually operate with just enough CO combustion additive to prevent afterburning. Conventional procedures can be used to determine if the right amount of promoter is present. In most refineries, afterburning shows up as a 30 F., 50 F. or 75 F. increase in temperature from the catalyst bed to the cyclones above the bed, with sufficient promoter added so that no more afterburning than this occurs.

In one commercial test, discussed in the EXPERIMENT section below, we ran almost 200 F. of afterburning and achieved extraordinary reductions in NOx. We were uncomfortable with such a large amount of afterburn but pleased with the results. The test results show that our NOx reduction process works very well with large amounts of afterburning. Although we cannot prove it from the data available, we cannot rule out that afterburning may be necessary in some units to achieve large NOx reductions.

SOx ADDITIVES

Additives may be used to adsorb SOx. These are believed to be primarily various forms of alumina, rare-earth oxides, and alkaline earth oxides, containing minor amounts of Pt, on the order of 0.1 to 2 ppm Pt. Additives for removal of SOx are available from several catalyst suppliers, such as Davison's "R" or Katalistiks International, Inc.'s "DESOX."

Surprisingly, the invention permits efficient use of these additives, even though the regenerator is not in complete CO combustion mode. When a regenerator is in complete CO burn mode, SOx capture additives usually recover on the order of 60 to 70% of the SOx, while in conventional partial CO burn mode SOx capture drops to 30% or so. In our process SOx additives can still capture more than 40%, and preferably more than 50% of the SOx while NOx emissions are drastically reduced.

FCC REACTOR CONDITIONS

The reactor operation will usually be conventional all-riser cracking FCC, such as disclosed in U.S. Pat. No. 4,421,636, incorporated by reference. Typical riser cracking reaction conditions include catalyst/oil ratios of 0.5:1 to 15:1 and preferably 3:1 to 8:1 and a catalyst contact time of 0.1–50 seconds, preferably 0.5 to 10 seconds, and most preferably about 0.75 to 5 seconds, and riser top temperatures of 900 to about 1100, preferably 950 to 1050 F.

It is important to have good mixing of feed with catalyst in the base of the riser reactor, using conventional techniques such as adding large amounts of atomizing steam, use of multiple nozzles, use of atomizing nozzles and similar technology.

It is preferred, but not essential, to have a riser catalyst acceleration zone in the base of the riser.

It is preferred, but not essential, to have the riser reactor discharge into a closed cyclone system for rapid and efficient separation of cracked products from spent catalyst. A closed cyclone system is disclosed in U.S. Pat. No. 4,502,947 to Haddad et al, incorporated by reference and in various journal articles.

It is preferred, but not essential, to strip rapidly the catalyst just as it exits the riser, and upstream of the conventional catalyst stripper. Stripper cyclones disclosed in U.S. Pat. No. 4,173,527, Schatz and Heffley, incorporated herein by reference, may be used.

It is preferred, but not essential, to use a hot catalyst stripper. Hot strippers heat spent catalyst by adding some hot, regenerated catalyst to spent catalyst. Suitable hot stripper designs are shown in U.S. Pat. No. 3,821,103, Owen et al, incorporated herein by reference. If hot stripping is used, a catalyst cooler may be used to cool the heated catalyst before it is sent to the catalyst regenerator. A preferred hot stripper designs are shown in U.S. Pat. No. 4,820,404, Owen, incorporated by reference.

Conventional FCC steam stripping conditions can be used, with the spent catalyst having essentially the same temperature as the riser outlet and with 0.5 to 5 % stripping gas, preferably steam, added to strip spent catalyst.

The FCC reactor and stripper conditions, per se, can be conventional.

CATALYST REGENERATION

The process and apparatus of the present invention can use conventional bubbling dense bed FCC regenerators. The process works even better when the FCC regenerator has a downstream CO boiler. Most regenerators with downstream CO boilers are bubbling dense bed regenerators, either swirl, cross-flow, or Orthoflow type. Much of the regeneration gas, usually air, passes through the bed in the form of bubbles. These pass through the bed but contact it poorly.

These units operate with large amounts of catalyst, because the bubbling bed regenerators are not very efficient at burning coke, hence a large inventory and long residence time in the regenerator were needed to get clean burned catalyst.

The carbon on regenerated catalyst can be conventional, typically less than 0.3 wt % coke, and more preferably less than 0.15 wt % coke, and most preferably even less. By coke we mean not only carbon, but minor amounts of hydrogen associated with the coke, and perhaps even very minor amounts of unstripped heavy hydrocarbons which remain on catalyst. Expressed as wt % carbon, the numbers are essentially the same but 5 to 10% less.

Although the carbon on regenerated catalyst can be the same as that produced by conventional FCC regenerators, the flue gas composition is unusual.

The CO content of the flue gas should be low, less than 2 or 2.5 volume % CO. We prefer to operate with CO contents ranging from 100 to 10,000 or 20,000 ppm, volume, (0.001 to or 2 volume %), preferably 250 to 10,000 ppm, and most preferably 500 to 7500 ppm.

The CO content must also be considered with the oxygen content of the flue gas. The oxygen content of the flue gas should usually be less than ½ the amount of CO by volume or molar amount. This will ensure that an overall reducing, or somewhat reducing, atmosphere will be maintained in the regenerator. Poor air distribution, or poor catalyst circulation in the regenerator, may require use of slightly more regeneration air to achieve the desired regeneration.

It is important to have less than 1.0 % oxygen in the regenerator flue gas and preferably no more than about 0.5 mole oxygen in the flue gas. We prefer to have from 0.0 to 0.3 moles % oxygen and most preferably from 0.01 or 0.05 up to about 0.2 mole % oxygen in the flue gas. Because of poor contact of regeneration air with catalyst or localized stagnant regions in either the dense bed, or above, or because of poor air distribution, it may be necessary to operate with slightly more air than is preferred, up to about 1.0 mole % oxygen in flue gas.

These are useful guidelines, but as will be recognized by those skilled in the regeneration arts, these are unusual limits for oxygen and CO in regenerator flue gas.

Most FCC regenerators in partial CO burn mode will have 4 to 8 mole % CO in the flue gas. Some may operate with lower amounts of CO, perhaps in the 2 or 3 mole % range, but none are believed to operate at steady state with 1% CO in the flue gas. It would also be unusual to have such low amounts of oxygen in the flue gas, with such CO contents.

A prior art regenerator in partial CO burn mode would have very little oxygen present in the flue gas, well within the limits preferred for the present invention, but would have much large amounts of CO present.

A prior art regenerator in complete CO burn mode would usually have less than 500 ppm CO in the flue gas, but would always have more free oxygen present. Almost all bubbling bed regenerators operating in complete CO combustion mode are believed to operate with at least 1.0 mole % oxygen in the flue gas, and many operate with 1 or 2 mole % oxygen in the flue gas, so little or no CO will remain in the flue gas. Some may operate with as little as 0.7 % excess oxygen.

While it is easy to operate a regenerator in complete CO combustion mode with more than 1.0 mole % oxygen in the flue gas, it is difficult to operate one with less than 1% oxygen and some CO but less than 1 mole % CO. Usually, it will be preferred to monitor frequently or continuously both the free oxygen content of the flue gas and the CO content of the flue gas. Use of a meter or measuring device, which indicates if a reducing or oxidizing atmosphere is present, will be suitable.

Use of afterburning, or dilute phase combustion of CO to CO2 either in the regenerator or in a flue gas line, can be a useful control variable for regenerator air rate, but it must be used with caution. The flue gas from the regenerator, or in the dilute phase region above the regenerator, has very little CO or oxygen present. Afterburning can be lost either because too much air is present (no CO), or not enough air is being added (no O2).

Afterburning could disappear in a commercial unit if a large amount of resid is intentionally or accidentally added to the FCC feed. The extra coke make attributable to the resid would rapidly consume all the excess air in the regenerator and eliminate or reduce afterburning.

Afterburning could also be reduced or eliminated by a shift to a very clean, low coke making feed. Less coke would be charged to the regenerator, and all the CO might be completely consumed in the dense bed (our unit will have almost the same heat release characteristics as a full CO burn regenerator and will have a temperature which will permit CO burning within, or just above, the bubbling dense bed. (This is discussed at greater length hereafter.)

This unpredictability of the regenerator to constant changes in coke make (such changes occur all the time in commercial refineries) is one of the reasons refiners try hard to operate in either full CO burn or in partial CO burn. The conventional control methods, relying on dilute phase afterburning or dense bed temperature to control air rate, do not work in our process. We must operate the regenerator in a region where the temperature response of the regenerator is almost flat and where it is difficult to tell if too much or too little air is being added. Afterburning can be lost if either too much or too little air is added, and the plant operators will not know what to do to bring the unit back into desired regime.

If the unit becomes too reducing, NOx production (and reduction) within the regenerator will plummet, while NOx production in the downstream CO boiler will soar, resulting in a sharp increase in NOx emissions which could violate local pollution restrictions.

The conventional control methods cannot be relied on with safety in our largely unexplored region of regenerator operation. Conventional control methods are as useless as magnetic compasses to arctic explorers near the Magnetic North Pole. Although many refiners have operated in these regions "en passant," none have stayed to reduce NOx emissions.

The temperature in our regenerator will be similar to temperatures in prior art regenerators operating in complete CO combustion mode because more than 90 % of the coke on catalyst is burned to form C02 rather than CO. There will be slightly less heat release than in a prior art regenerator operating in full CO burn mode, offset by less excess air being heated and sent up the stack.

We do not prefer high temperature operation of the regenerator. We would prefer to keep regenerator temperatures low to make such afterburning as may occur less troublesome. We would like to operate with temperatures below 1300 F., and preferably below 1250 F. to reduce NOx emissions, but many units will be run above 1300 F., e.g., from 1330 to 1400 F. Some form of heat removal, such as heat exchanger tubes, or less preferably, steam quench, may be used to reduce regenerator temperature if desired.

Our process will allow bubbling bed regenerators to make better use of regeneration air than any known bubbling bed regenerator in complete CO combustion mode. There is essentially no waste of combustion air in our process. Prior art bubbling bed regenerators, in complete CO combustion mode, usually operate with 5 or 10 % excess air addition to ensure 1 or 2% excess air in the flue gas. Our process has essentially the same heat release but without the need for this excess air. Our process will thus permit a 5 to 10 % increase in throughput of FCC units limited by regenerator air blower.

Our process may also be used with high efficiency regenerators (H.E.R.), those with a fast fluidized bed coke combustor, dilute phase transport riser, and a second bed to collect regenerated catalyst. It will be necessary to operate these in partial CO burn mode and add a CO boiler, or catalytic converter, to make CO specifications.

H.E.R.'s inherently make better use of regeneration air, but most still operate with 1 % 02 or more in the flue gas, so slightly better use can be made of regeneration air from the process of the present invention.

Although most regenerators are controlled primarily by adjusting the amount of regeneration air that is added, other equivalent control schemes are available which keep the air constant and change some other condition. Constant air rate, with changes in feed rate changing the coke yield, is an acceptable way to modify regenerator operation. Constant air, with variable feed preheat, or variable regenerator air preheat, are also acceptable. Finally, catalyst coolers can be used to remove heat from a unit. If a unit is not generating enough coke to stay in heat balance, torch oil, or some other fuel, may be burned in the regenerator.

CO COMBUSTION MEANS

Although in its broadest embodiment the present invention does not require a CO boiler, it usually will be preferred to operate with a CO boiler, or other means such as a catalytic converter, to remove additional amounts of CO from regenerator flue gas. There is so little CO in the flue gas from our regenerator that the heat recovered from a CO boiler will not usually justify the installation of a CO boiler. A CO boiler will usually be required to comply with local CO emissions limits and also provides more degrees of freedom to operate the FCC regenerator so NOx emissions are greatly reduced. CO boiler operation will be reviewed first, followed by a review of some other means to reduce CO emissions.

CO BOILER

Any conventional CO boiler can be used herein.

Preferably, the CO boiler is operated in multiple stages to reduce the flame temperature occurring in any one stage and limit NOx formation in an oxidizing atmosphere. Low NOx burners are also preferred to burn the fuel gas which will probably be needed to keep the CO boiler "lit."

One reason the present invention works so well with a CO boiler is because it requires the CO boiler to do very little. The flue gas to the CO boiler contains very little that will burn. We believe most of the NOx precursors are eliminated in the regenerator and that most of the fuel which leads to high temperatures, and creation of NOx by oxidation of nitrogen are eliminated. Low BTU flue gas from our regenerator now becomes a diluent that prevents inordinate temperature rise in the CO boiler, rather than a fuel which creates high temperatures and forms excessive NOx.

Efficient mixing between the CO gas and the fuel gas will minimize the fuel gas flame tip temperature. This can be accomplished, for example, by introducing the flue gas, premixed with air, at high velocity in the annular regions around the fuel gas flames. The adiabatic temperature of the CO gas (even with up to 10 % CO) is around 1400-1800 F., which is much lower than the flame tip temperature associated with burning fuel gas (>2800 F.). Because the fuel gas volume is small, typically only 0.1 to 2 % of the flue gas, the adiabatic temperature of the mixture is approximately that of the CO gas. Mixing rapidly will keep the flame tip temperature closer to the 1400-1800 region and minimize NOx formation. For the fuel gas, low NOx burners, such as those available from John Zink and other burner manufacturers, may be used.

To reduce NOx emissions even further, it may be beneficial to add ammonia or an ammonia precursor such as urea to the CO boiler. These materials react quickly with NOx to reduce it to nitrogen.

OTHER CO COMBUSTION MEANS

Although refiners with CO boilers will probably prefer to continue to use them, it may not be cost justifiable to install them in units without them because of the low BTU value of flue gas from our regenerator.

Conventional methods of converting the minor amounts of CO remaining in the flue gas may be used, such as Pt gauze, or bead catalyst with Pt or honeycombs coated with Pt or similar CO combustion promoter. Such catalytic CO converters are conventional in many other services, such as wood stoves, or automobile exhaust but so far as is known have never been used on FCC flue gas.

Use of Pt based CO combustion promoter may promote some additional formation of NOx from NOx precursors in the FCC regenerator flue gas compared to a conventional CO boiler. Usually, this will be tolerable as most of the NOx precursors in flue gas from the regenerator will be eliminated upstream of the CO boiler.

CO, NOX EMISSIONS AFTER CO COMBUSTION

Regardless of the intermediate steps, the flue gas produced downstream of CO converter will have an unusually low level of both NOx and CO. The NOx and CO levels should be below 100 ppm. Preferably, the NOx and CO levels will both be below 50 ppm.

EXAMPLE

Tests were conducted to determine the effectiveness of various modes of operation of a bubbling bed catalyst regenerator at reducing $NO_x$ emissions and reducing the formation of NOx precursors. These tests were run on a commercial unit with a cross-flow regenerator. The catalyst was maintained as a bubbling, dense phase fluidized bed, with spent catalyst added from one side of the regenerator, and regenerated catalyst removed from the other side. Test results are summarized in FIG. 2.

Figure 2:
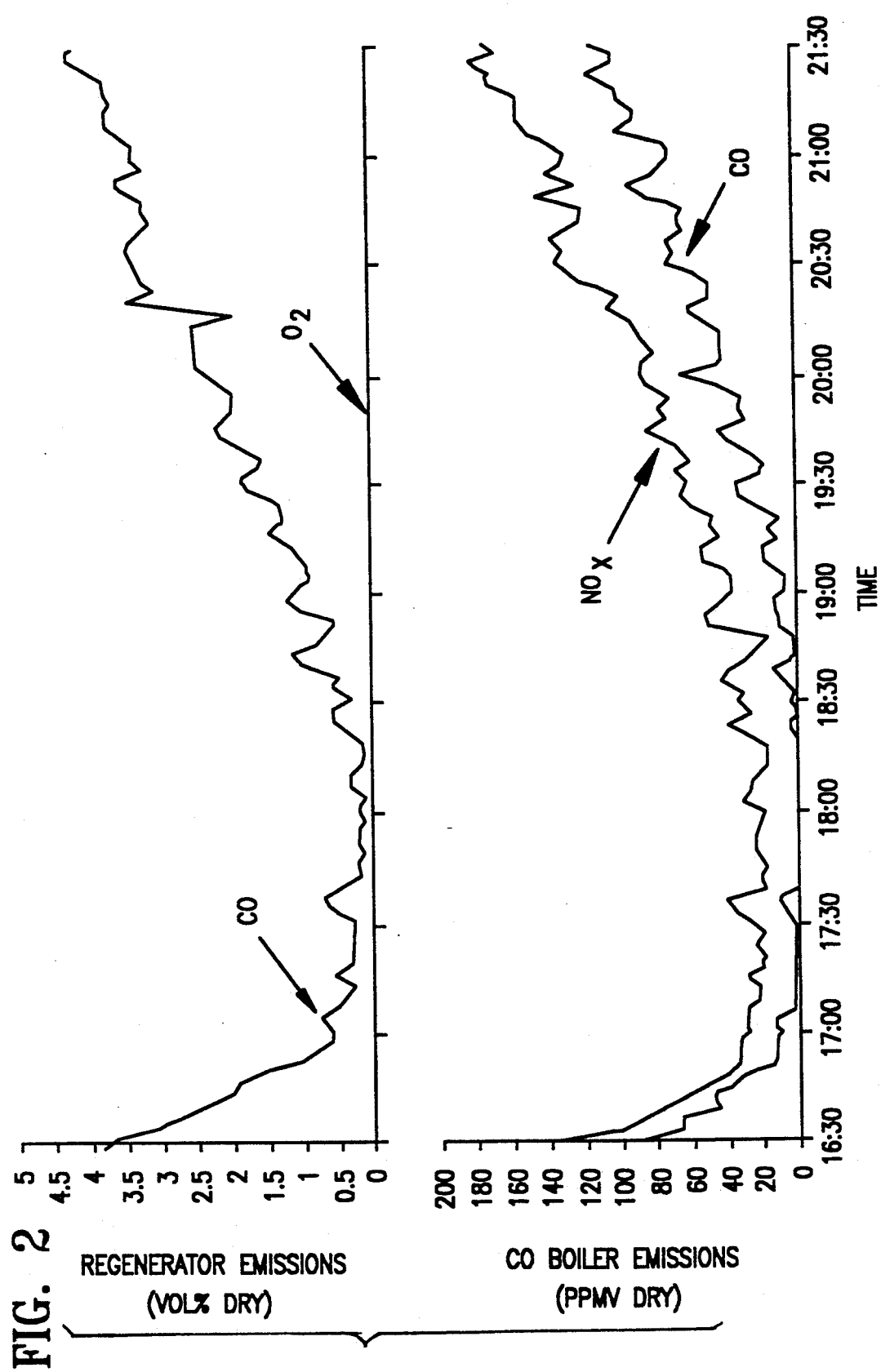
FIG. 2. (Invention) is plot of regenerator and CO boiler flue gas compositions as an FCC regenerator shifts from partial CO burn operation to the low NOx region and then back to partial CO burn operation.

FIG. 2 shows how regenerator emissions and CO boiler emissions change as a unit going from partial CO combustion to the region claimed and then back into partial CO combustion.

During the demonstration, the FCC feed contained 0.2 wt % total nitrogen.

At the start of the test, 16:30 hours, the unit was in conventional partial CO burn mode, with almost 4% CO in the flue gas. NOx emissions are not shown from the regenerator. There probably was very little NOx in the regenerator flue gas, as is typical in the highly reducing atmosphere of an FCC regenerator in partial CO burn mode. Oxygen was usually essentially zero throughout the test, save for one short excursion up 0.1 vol % oxygen at 18:20. NOx emissions were slightly above 120 ppmv, dry basis, at the start of the test.

As CO levels from the regenerator decreased, both NOx and CO emissions from the CO boiler decreased. During the roughly two hour period from 17:00 to 19:00, CO in flue gas from the regenerator was less than 1%, and NOx emissions from the CO boiler were below 40 ppmv and usually were around 20 ppmv. Although not shown in the Figure, there was an unusual amount of afterburning occurring in the regenerator during this period. As CO levels dropped, afterburning increased. When the CO level was less than 1 % volume, the dense bed temperature was 1260 F. and the cyclone temperatures reached 1470 F.

At all times, the CO boiler was kept hot enough so that the CO could be efficiently burned in the boiler; this required addition of enough fuel gas to compensate for the reduced amount of CO present in regenerator flue gas. The adiabatic combustion temperature for the mix of CO containing flue gas and fuel gas was always at least 1600 F. The CO boiler was run so that the flue gas from it contained about 1.6 vol % oxygen, wet gas basis. We do not think the CO boiler was sensitive to oxygen concentration, i.e., we could find little correlation between NOx and oxygen levels.

The CO boiler was believed to be even more effective than the results shown in the Figure in that a small leak in the bypass line around the CO boiler was suspected by the refiner. The CO conversions are good, regardless, and clearly show that reduced NOx was not achieved at the expense of higher boiler CO emissions.

STARTUP

To get the regenerator in our "uncomfortable" operating regime and keep it there, we would take the following steps:

First, the FCC unit would be started conventionally and the regenerator run in either partial or full CO burn mode. Then the air rate to the regenerator should be adjusted (increased in partial combustion, decreased in full combustion mode) until the flue gas composition is in the specified range. The concentration of CO and 02 from the regenerator should be monitored continuously. One possible control strategy would be to manipulate the air rate to control the quantity (CO/2) - O2. When this quantity is 0, there is stoichiometric O2 present to complete combustion of CO to CO2. Optimum operation would be achieved by controlling this quantity between −0.4 and 1.0, preferably between −0.1 and 0.5, and most preferably between 0.0 and 0.25. Afterburn, particularly in units with a large diameter dense bed regenerator, will likely be a problem at these conditions. To operate comfortably ad continuous in this mode, we would like to match closely air supply to coke supply, e.g., plug up portions of the air grid that may be letting too much air into one point in the regenerator. Use of steam or water may be needed to quench dilute phase, cyclone, or flue gas line temperatures. Cyclone metallurgy that can withstand high operating temperatures may be required.

DISCUSSION

The process of the present invention can be readily used in existing bubbling bed FCC regenerators with CO boilers with no hardware changes. Operation will be facilitated if the regenerator is equipped with fairly sophisticated controls, permitting control to be based at least in part on one or more flue gas compositions, such as NOx, CO, or free oxygen.

Most FCC regenerators, even those without CO boilers, can benefit from the process of the present invention in that reduced NOx emissions can be achieved while remaining within CO emissions limits.

Our unusual and hard to control mode of regenerator operation provides the key to operating an FCC regenerator and downstream CO boiler or CO conversion means. We believe it works because nitrogen in coke is efficiently converted primarily into $N_2$ in the regenerator. Our understanding of what goes on in the regenerator and CO combustion means may be incomplete, but what is important is that NOx emissions to the atmosphere are greatly reduced by the practice of the present invention.

When a CO boiler, equipped with low NOx nozzles, is used to burn the CO and NOx precursor containing flue gas from the FCC regenerator, NOx emissions can be significantly reduced as compared to those achievable now with the best commercially available technology. Using our process and apparatus, FCC flue gas NOx emissions can easily be reduced to less than 100 ppm, or even less than 50 ppm, while keeping CO emissions to similar limits. These results are strongly dependent on feed nitrogen (it is this feed nitrogen, sometimes called fuel nitrogen, which is the major source of NOx emissions). For an FCC feed with 0.2 wt % nitrogen, as used in the test, it was possible to reduce NOx emissions from the CO boiler to an average of about 20 ppmv. These are extraordinarily low NOx emissions and were achieved merely by changing operating conditions.

The flue gas eventually discharged to the atmosphere from our unit will have less than ½, and perhaps only 25 %, or 20%, or even only 10 % or less of the NOx emissions which would be produced by burning the same amount of nitrogen containing coke in either a bubbling bed regenerator operating in full CO burn mode or in one in partial CO burn mode with a downstream CO boiler.

The process and apparatus of the present invention provides a way for refiners to greatly reduce NOx emissions, while continuing to meet CO emissions specifications and while using SOx capture additives at reasonable effectiveness.

Very little capital expense is involved, especially for bubbling bed regenerators with a downstream CO boiler in place. The only thing that will be required with such units is forcing the regenerator to operate in the "on the brink" region, and using the existing CO boiler to do less. Many units have flue gas analyzers in place which will provide the necessary information for operators to safely control regenerator operation. At little cost, the instruments can be set for automatic control to minimize operator involvement. Continuous control will work best with units having fairly good catalyst distribution and good air distribution.

It is unusual to have a pollution control improvement which costs little or nothing to install or operate, profoundly reduces NOx emissions, and may even increase the capacity of the FCC unit. The practice of the present invention can increase slightly the capacity of some FCC regenerators, by allowing catalyst temperatures approaching those of complete CO burn units, without wasting 5-15% of the combustion air in the form of excess O2 in regenerator flue gas.

The only drawbacks to the practice of the present invention are the difficulties in controlling it, which can largely be overcome by using our control method, and the fact that it makes CO boiler operation more difficult in some units, primarily because most existing CO boilers will be considerably oversized. Additional fuel gas can be burned in the CO boiler, or added to the regenerator flue gas stream to make it easier to operate the CO boiler, although such additional combustion will usually lead to increased NOx emissions.

We claim:

1. A process for producing a flue gas containing less than 100 ppm, volume, Nox by burning coke and nitrogen compounds from a spent fluidized catalytic cracking (FCC) catalyst to regenerate said catalyst, wherein said nitrogen compounds are present in an amount sufficient to produce a stack gas Nox content discharged to the atmosphere of at least 100 ppm when said generator is operated in complete CO combustion mode or in partial CO combustion mode with a downstream CO boiler, comprising:
   a. continuously regenerating a spent FCC catalyst deactivated with coke and nitrogen compounds in a regenerator vessel containing one bubbling fluidized bed of catalyst by adding oxygen or an oxygen-containing regeneration gas to a lower portion of said bubbling bed and operating said regenerator at regeneration conditions including a dense bed temperature of 1100 to 1400 F. and sufficient to regenerate said spent catalyst and:
   i. oxidize at least a portion of the coke and nitrogen compounds on catalyst within said regenerator to Nox, CO and volatilized NOx precursors;
   ii. cause from 50° to 250° F. of afterburning intermediate said dense bed and a dilute phase region above said dense bed; and
   iii. produce a regenerator flue gas containing, on a volume %, dry basis;
      1. from 0.00 to 1.0 mole % oxygen
      2. from 0.05 to 2.0 mole % CO
      3. less than 50 ppm NOx; and
      4. volatilized NOx precursors;
   b. burning said regenerator flue gas in a CO burning means remote from and downstream of said regenerator by contact with additional oxygen containing gas at CO burning conditions sufficient to oxidize at least 50% of the CO content of the regenerator flue gas and at least 50% of the volatilized NOx precursors in the regenerator flue gas, and continuously produce a CO burner means flue gas containing
   1. 0.5 to 6 mole % oxygen
   2. less than 2000 ppm CO and
   3. less than 100 ppm NOx; and
   c. continuously recycling a stream of regenerated catalyst from said one bubbling fluidized bed of catalyst in said regenerator vessel to a catalytic cracking reactor.

2. The process of claim 1 wherein said flue gas from said regenerator contains from 0.0 to 0.3% oxygen, 500 to 10,000 ppm CO, and said flue gas from said CO burning means contains less than 1.5 mole % oxygen, less than 200 ppm CO, and less than 50 ppm NOx.

3. The process of claim 1 wherein the regenerator vessel flue gas has a BTU heating value, and additional fuel is added to said CO boiler, in an amount at least equal to the BTU heating value of the regenerator vessel flue gas.

4. The process of claim 1 wherein flue gas discharged from the CO burner means contains less than 25 ppm NOx and less than 25 ppm CO.

5. The process of claim 1 wherein the catalyst contains CO combustion promoter.

6. The process of claim 5 wherein 50 to 100 F. of afterburning occurs in said regenerator.

7. The process of claim 1 wherein 50 to 200 F. of afterburning occurs in said regenerator.

8. The process of claim 1 wherein flue gas from said CO burning means contains less than 100 ppm CO and less than 40 ppm $NO_x$.

9. A process for the catalytic cracking of a nitrogen containing hydrocarbon feed to lighter products comprising:
   a. cracking said feed by contact with a supply of hot, regenerated cracking catalyst in a fluidized catalytic cracking (FCC) reactor means operating at catalytic cracking conditions to produce a mixture of cracked products and spent cracking catalyst containing coke and nitrogen compounds;
   b. separating cracked products from said spent cracking catalyst to produce a cracked product vapor phase which is charged to a fractionation means and a spent catalyst phase;
   c. stripping spent catalyst in a stripping means to produce stripped, spent catalyst containing coke and nitrogen compounds;
   d. continuously regenerating stripped, spent catalyst in a catalyst regeneration means containing a single bubbling dense phase fluidized bed of catalyst with a dilute phase region above the dense bed by contact with oxygen or an oxygen-containing regeneration gas at catalyst regeneration conditions to continuously produce regenerated catalyst and a flue gas stream containing:
   from 0.00 to 0.75 mole % oxygen and
   at least 100 ppm, volume CO; and
   NOx and NOx precursors;
   e. recovering from said catalyst regeneration means regenerated catalyst and recycling same to said cracking reactor;
   f. charging said regenerator flue gas to a CO combustion means and oxidizing therein at CO combustion conditions at least a portion of said CO to CO2, and oxidizing at least a portion of said NOx precursors to NOx to continuously produce a stack gas which is discharged from the CO combustion means to the atmosphere containing;
   less than 100 ppm CO,
   a reduced content of NOx precursors relative to regenerator flue gas, and
   an increased NOx content relative to regenerator flue gas;
   g. at least periodically monitoring said NOx content of said gas discharged from said CO combustion means;
   h. controlling catalyst regeneration conditions in response to an increase of said NOx content of said stack gas discharged by increasing the formation of NOx and conversion of NOx within said regenerator, and reducing the amount of NOx precursors formed in said regenerator, while maintaining from 50° to 250° F. of afterburning between said bubbling dense bed said dilute phase region above said bubbling dense bed and by at least one of:
   changing regeneration conditions to increase the amount of oxygen in regenerator flue gas, while maintaining the oxygen concentration within the range of 0.0 to 0.75 moles %; and
   changing regenerator conditions to decrease the CO content of regenerator flue gas, while maintaining the CO concentration with the range of 100 ppm volume to 10,000 volume %; and
   converting within said regenerator at least a majority of said NOx and NOx precursors formed by combustion of nitrogen compounds within said regenerator to produce a regenerator flue gas containing a reduced total content of NOx and NOx precursors so that stack gas from said CO combustion means contains less than 50 ppm NOx and less than 100 ppm CO.

10. The process of claim 9 wherein the regenerator flue gas contains from 0.01 to 0.5 mole % oxygen and from 500 to 7,500 ppm volume CO.

11. The process of claim 9 wherein the regenerator flue gas contains from 0.01 to 0.25 mole % oxygen and from 750 to 5000 ppm volume CO, and wherein said stack gas from CO combustion means contains less than 1.0 volume % oxygen.

12. The process of claim 9 wherein the regenerator flue gas contains at least twice as much CO as oxygen, on a molar basis.

13. The process of claim 9 wherein the regenerator is a bubbling dense bed regenerator operating at a regenerator bed temperature of 1175 to 1400 F., a superficial vapor velocity of regeneration gas through said dense bed of 0.25 to 5 fps.

14. The process of claim 9 wherein both the CO and the O2 content of the regenerator flue gas are analyzed and the amount of regeneration air relative to the coke on spent catalyst adjusted to control said CO content and said O2 content, and wherein:
   the amount of air is decreased if oxygen concentration in the flue gas increases, and
   the amount of air is increased if CO concentration in the flue gas increases.

* * * * *